US012691804B2

(12) United States Patent
Bettcher, III et al.

(10) Patent No.: US 12,691,804 B2
(45) Date of Patent: Jul. 28, 2026

(54) ARMREST FOR A MODIFIED VEHICLE

(71) Applicant: The Braun Corporation, Winamac, IN (US)

(72) Inventors: Robert Earl Bettcher, III, Winamac, IN (US); Jonathan Paul Beck, Winamac, IN (US); Jordan Miller, Indianapolis, IN (US)

(73) Assignee: The Braun Corporation, Winamac, IN (US)

( * ) Notice: Subject to any disclaimer, the term of this patent is extended or adjusted under 35 U.S.C. 154(b) by 294 days.

(21) Appl. No.: 18/544,659

(22) Filed: Dec. 19, 2023

(65) Prior Publication Data

US 2024/0198878 A1    Jun. 20, 2024

Related U.S. Application Data

(60) Provisional application No. 63/433,828, filed on Dec. 20, 2022.

(51) Int. Cl.
B60N 2/75            (2018.01)

(52) U.S. Cl.
CPC ............. B60N 2/753 (2018.02); B60N 2/767 (2018.02)

(58) Field of Classification Search
CPC ........ A47C 7/541; A47C 7/543; B60N 2/753; B60N 2/767
See application file for complete search history.

(56) References Cited

U.S. PATENT DOCUMENTS

| | | | |
|---|---|---|---|
| 6,752,462 B1* | 6/2004 | Kain ..................... | B60N 2/2821 |
| | | | 297/250.1 |
| 6,916,068 B2* | 7/2005 | Kitamura ............... | B60N 2/753 |
| | | | 297/411.3 |

(Continued)

FOREIGN PATENT DOCUMENTS

| | | |
|---|---|---|
| CN | 105501088 B | 4/2016 |
| DE | 102005061254 A1 | 6/2007 |

(Continued)

OTHER PUBLICATIONS

International Search Report, Search Strategy, and Written Opinion of the International Searching Authority for PCT/US2021/062176, Mar. 17, 2022, 14 pages, International Searching Authority for the European Patent Office.

(Continued)

*Primary Examiner* — Philip F Gabler
(74) *Attorney, Agent, or Firm* — Daniel Tallitsch; Tyler Schultz

(57) ABSTRACT

An armrest assembly is adapted for use with an OEM seat in a modified OEM vehicle. The armrest has a pivoting connector adapted for connection to the seat, whereby the armrest can be rotated in both a first rotational direction and a second rotational direction relative to the seat. A locking assembly is disposed between the armrest and the seat, whereby the locking assembly permits the armrest to rotate from a stowed position to a deployed position in both the first rotational direction and the second rotational direction and whereby the locking assembly is configured to engage when the armrest is in the deployed position to hold the armrest in the deployed position. The armrest assembly is configured such that the armrest will not block a seat-mounted airbag in both the stowed and deployed position.

20 Claims, 13 Drawing Sheets

(56) References Cited

U.S. PATENT DOCUMENTS

| | | | | |
|---|---|---|---|---|
| 7,520,554 | B2 * | 4/2009 | Brown | B60N 2/753 |
| | | | | 296/68.1 |
| 8,177,301 | B2 * | 5/2012 | Saito | B60N 2/767 |
| | | | | 297/411.32 |
| 9,481,275 | B2 * | 11/2016 | Bohlke | B60N 2/753 |
| 9,676,307 | B2 * | 6/2017 | Yamane | B60N 2/753 |
| 10,589,648 | B2 * | 3/2020 | Kim | B60N 2/793 |
| 10,710,483 | B2 * | 7/2020 | Keller | B60N 2/753 |
| 10,889,218 | B2 * | 1/2021 | Vetere, II | B60N 2/203 |
| 10,993,535 | B2 * | 5/2021 | Nill | A47C 1/0308 |
| 11,707,136 | B2 * | 7/2023 | Richardson | A47C 9/002 |
| | | | | 297/411.36 |
| 2002/0105217 | A1 | 8/2002 | Khedira et al. | |
| 2005/0218686 | A1 | 10/2005 | Takenoshita et al. | |
| 2013/0011181 | A1 * | 1/2013 | Riedmueller | A47C 7/5066 |
| | | | | 403/84 |
| 2018/0072200 | A1 | 3/2018 | Bohlke et al. | |
| 2019/0135144 | A1 | 5/2019 | Roeglin et al. | |
| 2019/0283640 | A1 | 9/2019 | Vetere | |
| 2021/0394698 | A1 | 12/2021 | Tanabe et al. | |
| 2022/0176858 | A1 | 6/2022 | Beck et al. | |

FOREIGN PATENT DOCUMENTS

| | | |
|---|---|---|
| DE | 102007014232 B4 | 10/2007 |
| DE | 102017218943 A1 | 4/2019 |
| DE | 102018127112 A1 | 4/2020 |
| EP | 3293043 A1 | 3/2018 |
| JP | H04125753 U | 11/1992 |
| WO | 97/46416 A1 | 12/1997 |
| WO | 2020/085304 A1 | 4/2020 |

OTHER PUBLICATIONS

European Patent Office, Extended European Search Report for Application No. 23217594.3 dated May 27, 2024 (6 pages).
United States Patent & Trademark Office, Office Action for U.S. Appl. No. 17/544,347 dated Mar. 22, 2024 (9 pages).

* cited by examiner

ARMREST FOR A MODIFIED VEHICLE

CROSS REFERENCE TO OTHER APPLICATIONS

This application claims priority to U.S. Provisional Patent Application 63/433,828, filed on Dec. 20, 2022, the contents of which is incorporated herein by reference.

FIELD OF THE DISCLOSURE

The present application relates to a passenger vehicle for transporting one or more passengers, and more particularly to a modified passenger vehicle which may be configured to provide access to the vehicle for a physically limited passenger.

BACKGROUND

Automobile manufacturers do not currently mass-produce passenger motor vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example, in one configuration, a van is retrofitted with a ramp to enable a physically limited individual using a wheelchair to enter and exit the vehicle without the assistance of another individual.

Other known products for retrofitting a vehicle, such as a van or sport utility vehicle (SUV), include wheelchair lifts, lift platforms, and lowered floor surfaces. In some instances, a floor of an original equipment manufacturer (OEM) vehicle is lowered or otherwise modified to accommodate an entry and exit of the physically limited individual through a side door or entrance of the vehicle into a middle part of the vehicle where the seating arrangement has been removed to accommodate an individual using a wheelchair. Once inside the vehicle, an individual who uses the assisted entrance can transfer from the wheelchair into the driver's seat to allow the individual to drive the vehicle.

In one known retrofitted vehicle, a row of middle seats or a bench seat is removed to accommodate a wheelchaired individual who will be driving. The driver's seat is replaced or modified with a swiveling base, whereby the driver's seat can rotate 90° or more toward a center of the vehicle (clockwise when the driver's position is located on the left side of the vehicle). To enable the individual to be seated in the driver's seat for driving, the driver's seat is rotated toward the location of the wheelchair in which individual is seated. The individual then moves from the wheelchair to the driver's seat and rotates the seat to a forward facing position for driving the vehicle.

It is understood that safety features of an OEM vehicle, when modified or retrofitted, must be maintained to ensure passenger safety when accommodating a physically limited individual who is driving the retrofitted vehicle. It is also desirable to maintain OEM comfort features the extent possible.

Many vehicles, such as the Chevy Traverse, come with a center console between the front driver and passenger seats. This console is fixed and must be removed in the course of the modification to allow for installation of removeable and/or rotating seat bases and wheelchair maneuverability. Removing the console removes the armrest for both driver and front passenger. One solution to this first problem is to add seat-mounted armrests to the OEM front seats. The Chevy Traverse, in particular, includes seat-mounted armrests in its second row seats, which can be sourced and added to the Traverse front seats.

This presents a second problem with the driver seat, as the Traverse comes with a seat-mounted airbag that deploys to the interior of the vehicle. To mount a second-row armrest on the driver seat means that it could be rotated up and into the path of a potentially deploying airbag when the armrest is not in use. Fixing the armrest in the deployed position is not practical. In order to maintain the clear space necessary when transferring from a wheelchair to the driver seat, the armrest needs to be rotated, which as mentioned above causes interference with a deploying seat-mounted airbag.

One solution to this problem employed in the prior art is described in U.S. patent application Ser. No. 17/544,347, filed on Dec. 7, 2021 and entitled "Front Seat Quick Release Armrest," which is incorporated herein by reference. The '347 application proposes modifying the armrest to become removeable with a simple detent pin. The armrest of the '347 application cannot be reinstalled in or rotated to the upward/stowed position (which would adversely affect airbag deployment) since the detent is designed to not engage in the rotated position. Instead, the armrest of the '347 application must be removed when the person transfers between the wheelchair to the driver seat and can be reinstalled in the horizontal position after transfer. In some cases, it may also be desirable or necessary to remove the armrest to allow the passenger to buckle themselves into the vehicle. Removing the prior art armrest, however, can be difficult for a wheelchaired passenger who is alone and/or has limited mobility.

What is needed therefore is replacement, modified, or retrofitted driver's side seat that includes an armrest that need not be removed during transfer and can be moved to a stowed position without impacting any safety features of the original OEM vehicle (e.g., the seat-mounted airbag).

SUMMARY OF THE EMBODIMENTS

In one embodiment of the present disclosure, there is provided an armrest assembly for a seat. The armrest assembly can include an armrest and a locking assembly. The armrest may include a pivoting connector adapted for connection to the seat, whereby the armrest can be rotated in both a first rotational direction and a second rotational direction relative to the seat. The connection to the seat can be made direct to either the seat bottom or the seat back. The connection to the seat can also be made indirect, for example to the seat platform, the seat base, or other structures in the vehicle near the seat. The locking assembly permits the armrest to rotate from a stowed position to a deployed position in both the first rotational direction and the second rotational direction. The locking assembly may be configured to engage when the armrest is in the deployed position to hold the armrest in the deployed position.

In one implementation of that embodiment, the pivoting connector can be configured to allow the armrest to pivot 360 degrees in at least one of the first rotational direction and the second rotational direction.

In another implementation, the locking assembly can comprise a first locking member coupled to the armrest and a second locking member configured to be coupled to the seat. Additionally, the first locking member and the second locking member can be configured to engage when the armrest is in the deployed position to hold the armrest in the deployed position.

In yet another implementation, the locking assembly can comprise a one-way gate assembly configured to be coupled to at least one of the armrest and the seat. The one-way gate assembly can be configured to permit the armrest to rotate from a stowed position to a deployed position in both the first rotational direction and the second rotational direction, to prevent the armrest from rotating from the deployed position to the stowed position in the first rotational direction, and/or to permit the armrest to rotate from the deployed position to the stowed position in the second rotational direction.

In one version of the previous implementations, one of the first locking member and the second locking member can comprise a pin and the other of the first locking member and the second locking member can comprise a gate. The gate may be configured to open and permit the pin to pass thereby when the armrest rotates in the second rotational direction and to remain closed and prevent the pin from passing thereby when the armrest rotates in the first rotational direction.

In another version, the armrest assembly can further include a stop. Additionally, the gate can be embodied as a pivoting lever biased to a closed position against the stop. Further, the pin can be configured to push and rotate the pivoting lever to an open position when the armrest is rotated in the second rotational direction whereby the pin may pass thereby. Further yet, the stop can be configured to engage with and hold the gate in the closed position, whereby the pin cannot push and rotate the pivoting lever to an open position when the armrest is rotated in the first rotational direction.

In yet another version, the armrest assembly can further include a detent configured to be coupled to the same one of the armrest and seat as the gate. Additionally, the detent can be configured to engage with the pin when the armrest is in the stowed position.

In another implementation, the pivoting connector can be configured to allow the armrest to pivot 360 degrees in both the first rotational direction and the second rotational direction.

In one version of the previous implementations, the locking assembly can include a pin connector assembly, where one of the first locking member and the second locking member comprises a male pin connector and the other of the first locking member and the second locking member comprises a female pin connector. The female pin connector can be configured to receive the male pin connector when the armrest is rotated to the deployed position in the first rotational direction.

In another implementation, the pivoting connector can include a ball-and-socket joint, whereby an end of the armrest can be pivoted laterally inward and outward between an aligned position and a misaligned position. In the aligned position, the locking assembly may be aligned to engage when the armrest is rotated to the deployed position. In the misaligned position, the locking assembly may not be aligned to engage, whereby the armrest can freely rotate 360 degrees in both the first rotational direction and the second rotational direction.

In yet another implementation, the armrest assembly can include an armrest support, wherein the armrest is coupled to the armrest support via the pivoting connector and the armrest support is configured for connection to the seat.

In yet another implementation, the pivoting connector can comprise a quick-release mechanism, whereby the armrest is configured to be selectively attached and detached from the seat.

In yet another implementation, the armrest may be oriented vertically downward from the pivoting connector in the stowed position.

In yet another implementation, the armrest assembly may be coupled to a seat with an airbag that deploys through an aperture in a side of the seat, wherein the armrest does not obstruct deployment of the airbag in both the stowed position and the deployed position.

In another embodiment of the present disclosure, a method for modifying an OEM vehicle using any embodiment, implementation, and version described above, and any combination thereof, is provided. The method can include, in any order, removing a center console between a driver seat and a passenger seat; providing the armrest assembly; and, attaching the armrest assembly to at least one of the driver seat and the passenger seat, wherein at least one of the driver seat and the passenger seat includes an airbag that deploys through an aperture in a side of the seat, and wherein the armrest does not obstruct deployment of the airbag in both the stowed position and the deployed position.

In yet another embodiment of the present disclosure, an armrest assembly for a seat is provided. The armrest assembly can include an armrest and a one-way gate assembly. The armrest may have a pivoting connector adapted for connection to the seat, whereby the armrest can be rotated in both a first rotational direction and a second rotational direction relative to the seat. The one-way gate assembly can be configured to be coupled to at least one of the armrest and the seat. Additionally, the one-way gate assembly can be configured to permit the armrest to rotate from a stowed position to a deployed position in both the first rotational direction and the second rotational direction, to prevent the armrest from rotating from the deployed position to the stowed position in the first rotational direction, and/or to permit the armrest to rotate from the deployed position to the stowed position in the second rotational direction.

In one implementation of that embodiment, the armrest can be configured to traverse a first path when rotating from the stowed position to the deployed position in the first rotational direction and a second path when rotating from the stowed position to the deployed position in the second rotational direction. The first path may be longer than the second path.

In another implementation, the one-way gate assembly can comprise a pin and a gate configured to engage as the armrest rotates relative to the seat. Further, one of the pin and the gate can be coupled to and rotate with the armrest, wherein the pin traverses a circular path from a frame of reference of the gate. Further yet, the gate can be moveable between a closed position and an open position. In the closed position, the gate can be disposed inside and block the circular path of the pin. In the open position, the gate can be disposed outside of and not block the circular path of the pin. Further yet, when the armrest is rotated in the second rotational direction, the pin can be configured to engage with a first side of the gate and move the gate from the closed position to the open position. Even further yet, when the armrest is rotated in the first rotational direction, a second side of the gate can be configured to engage with the pin to prevent rotation of the armrest past the deployed position.

In one version of the previous implementation, the armrest assembly can also include a stop. Additionally, the gate can be embodied as a pivoting lever biased to the closed position against the stop. Further, the pin can be configured to push and rotate the pivoting lever to the open position when the armrest is rotated in the second rotational direction whereby the pin may pass thereby. Further yet, the stop can be configured to engage with and hold the gate in the closed position, whereby the pin cannot push and rotate the pivoting lever to an open position when the armrest is rotated in the first rotational direction.

In another version, the armrest assembly can include a detent configured to be coupled to the same one of the armrest and seat as the gate, wherein the detent is configured to engage with the pin when the armrest is in the stowed position.

In another implementation, the armrest can be coupled to an armrest support via the pivoting connector and the armrest support can be configured for connection to the seat.

In yet another implementation, the pivoting connector can include a quick-release mechanism, whereby the armrest is configured to be selectively attached and detached from the seat.

In another implementation, the armrest can be oriented vertically downward from the pivoting connector in the stowed position.

In another implementation, the armrest can be coupled to a seat with an airbag that deploys through an aperture in a side of the seat, wherein the armrest does not obstruct deployment of the airbag in both the stowed position and the deployed position.

In another embodiment of the present disclosure, a method for modifying an OEM vehicle using the embodiment, implementations, and versions described immediately above, and any combination thereof, is provided. The method can include removing a center console between a driver seat and a passenger seat; providing the armrest assembly; and, attaching the armrest assembly to at least one of the driver seat and the passenger seat, wherein at least one of the driver seat and the passenger seat includes an airbag that deploys through an aperture in a side of the seat, and wherein the armrest does not obstruct deployment of the airbag in both the stowed position and the deployed position.

In yet another embodiment of the present disclosure, an armrest assembly for a seat is provided. The armrest assembly can include an armrest and a pin connector assembly. The armrest can have a pivoting connector adapted for connection to the seat, whereby the armrest can be rotated in both a first rotational direction and a second rotational direction relative to the seat. The pin connector assembly can include a male pin connector and a female pin connector. One of the male pin connector and the female pin connector can be coupled to and rotate with the armrest, whereby the male pin connector traverses a circular path from a frame of reference of the female pin connector. Additionally, the female pin connector can be configured to receive the male pin connector when the armrest is rotated from a stowed position to a deployed position in the first rotational direction.

In one implementation of that embodiment, the pivoting connector can include a ball-and-socket joint, whereby an end of the armrest can be pivoted laterally inward and outward between an aligned position and a misaligned position. In the aligned position, the pin connector assembly can be aligned to engage when the armrest is rotated to the deployed position. In the misaligned position, the pin connector assembly can be not aligned to engage, whereby the armrest can freely rotate 360 degrees in both the first rotational direction and the second rotational direction.

In another implementation, the armrest can be coupled to an armrest support via the pivoting connector and the armrest support can be configured for connection to the seat.

In another implementation, the pivoting connector can include a quick-release mechanism, whereby the armrest is configured to be selectively attached and detached from the seat.

In another implementation, the armrest can be oriented vertically downward from the pivoting connector in the stowed position.

In another implementation, the armrest assembly can be coupled to a seat with an airbag that deploys through an aperture in a side of the seat, wherein the armrest does not obstruct deployment of the airbag in both the stowed position and the deployed position.

In another embodiment of the present disclosure, a method for modifying an OEM vehicle using the embodiment, implementations, and versions described immediately above, and any combination thereof, is provided. The method can include the steps of: removing a center console between a driver seat and a passenger seat; providing the armrest assembly; and, attaching the armrest assembly to at least one of the driver seat and the passenger seat, wherein the at least one of the driver seat and the passenger seat includes an airbag that deploys through an aperture in a side of the seat, and wherein the armrest does not obstruct deployment of the airbag in both the stowed position and the deployed position.

In yet another embodiment of the present disclosure, there is provided a method of converting an OEM vehicle to a vehicle adapted to driven by an individual having a physical limitation requiring the use of a wheelchair. The method includes the steps of: removing a second row seat from the OEM vehicle; removing an armrest assembly from the second row seat; modifying the armrest to form a modified armrest assembly having any one or more of the features described above; and attaching that modified armrest assembly to a front row seat. In another implementation, the method can include the step of removing a center console between the front row seats.

BRIEF DESCRIPTION OF DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION OF THE EMBODIMENTS

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
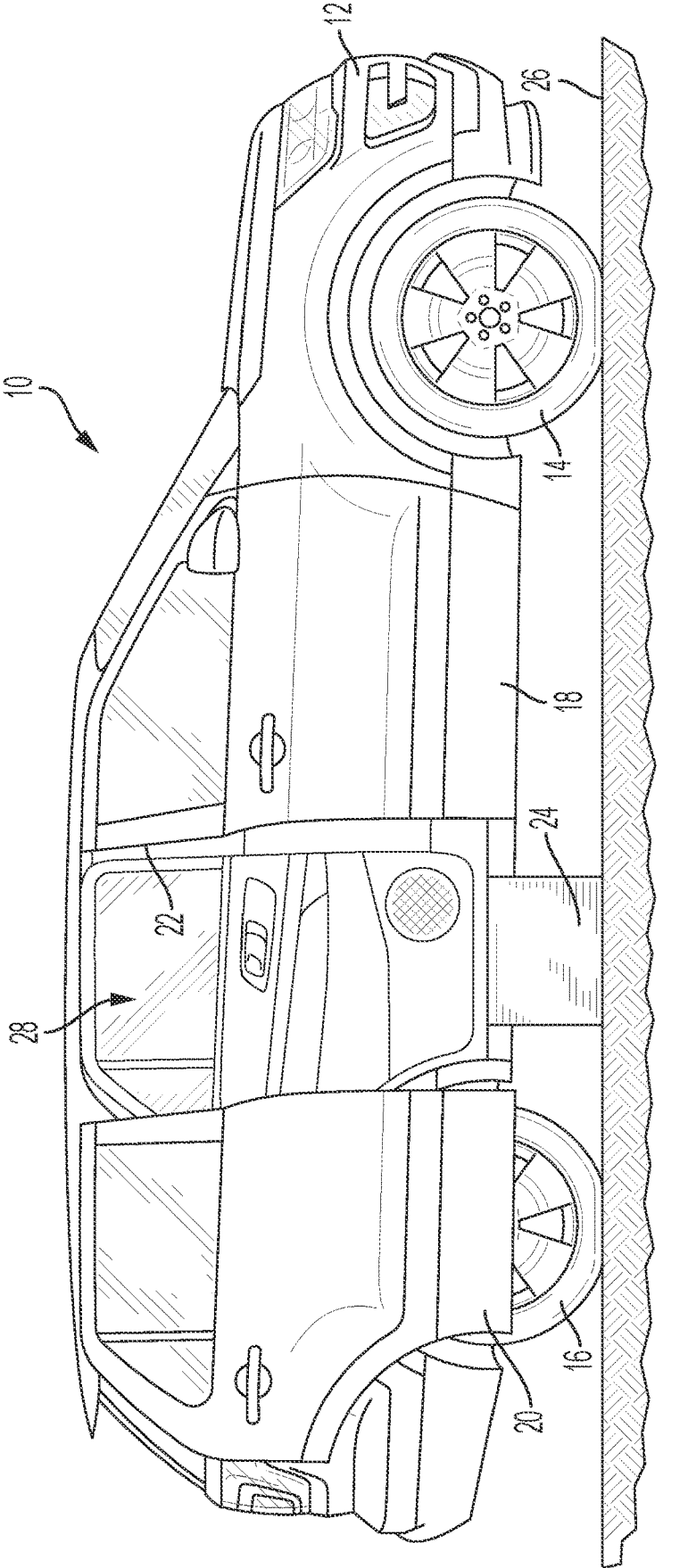
FIG. 1 illustrates an elevational side view of a sport utility vehicle including an access ramp.

FIG. 1 illustrates a sport utility vehicle (SUV) 10 available from any number of United States and foreign manufacturers. In the illustrated embodiment, the SUV, also called a crossover vehicle, includes a unibody construction, but other SUV's having a frame on body construction, are also included in the present disclosure. Consequently, the use of SUV herein includes all types and kinds of sport utility vehicles constructed with a body on frame construction, a unibody construction, or other constructions. In addition, while the SUV is illustrated in FIG. 1, the present disclosure is directed to all passenger vehicles carrying one or more passengers including vans.

FIG. 1 illustrates the SUV 10 including a body 12 operatively coupled to front wheels 14 and rear wheels 16. The SUV 10 includes a unibody construction. A first passenger side door 18 is located between the front wheels 14 and rear wheels 16 and provides access to a passenger for sitting in a front seat of the vehicle adjacent to the driver.

The SUV 10 has been modified to include a second passenger side door 20 coupled to the unibody frame through a mechanical linkage (not shown). In other embodiments, the side door 20 is coupled to the unibody frame through a sliding mechanism. In this embodiment, the second passenger side door has been modified to slide along a track (not shown) as opposed to the manufacturer supplied door which is hinged to swing away from the vehicle, as is understood by those skilled in the art. In addition to modifying the door 20 to slide along the track, an opening 22 to the interior, in some embodiments, is modified or widened to provide access to a passenger seated in a wheelchair. The opening is defined on the sides thereof by an edge of the door 20 and the edge of the door 18. The vehicle is further modified to include a ramp assembly 24 which provides rolling access of the wheelchair from pavement 26 into an interior 28 of the vehicle 10. The ramp assembly 24 is installed at the opening 22 and is movable between the interior of the vehicle, where it is stored in some embodiments, and to the exterior for wheeled mobility device or other mobility aid access (e.g., passengers with wheelchairs, scooters, walkers, crutches, etc.).

In known modified vehicles, such as modified vans or SUVs, the middle row of seats is removed from the manufacturer supplied vehicle to enable access to a wheelchair supporting a passenger or a driver. Once the wheelchaired passenger or driver moves into the interior of the vehicle, the passenger or driver locates the wheelchair in the middle portion of the interior behind the driver seat and passenger seat of the front row.

Figure 2:
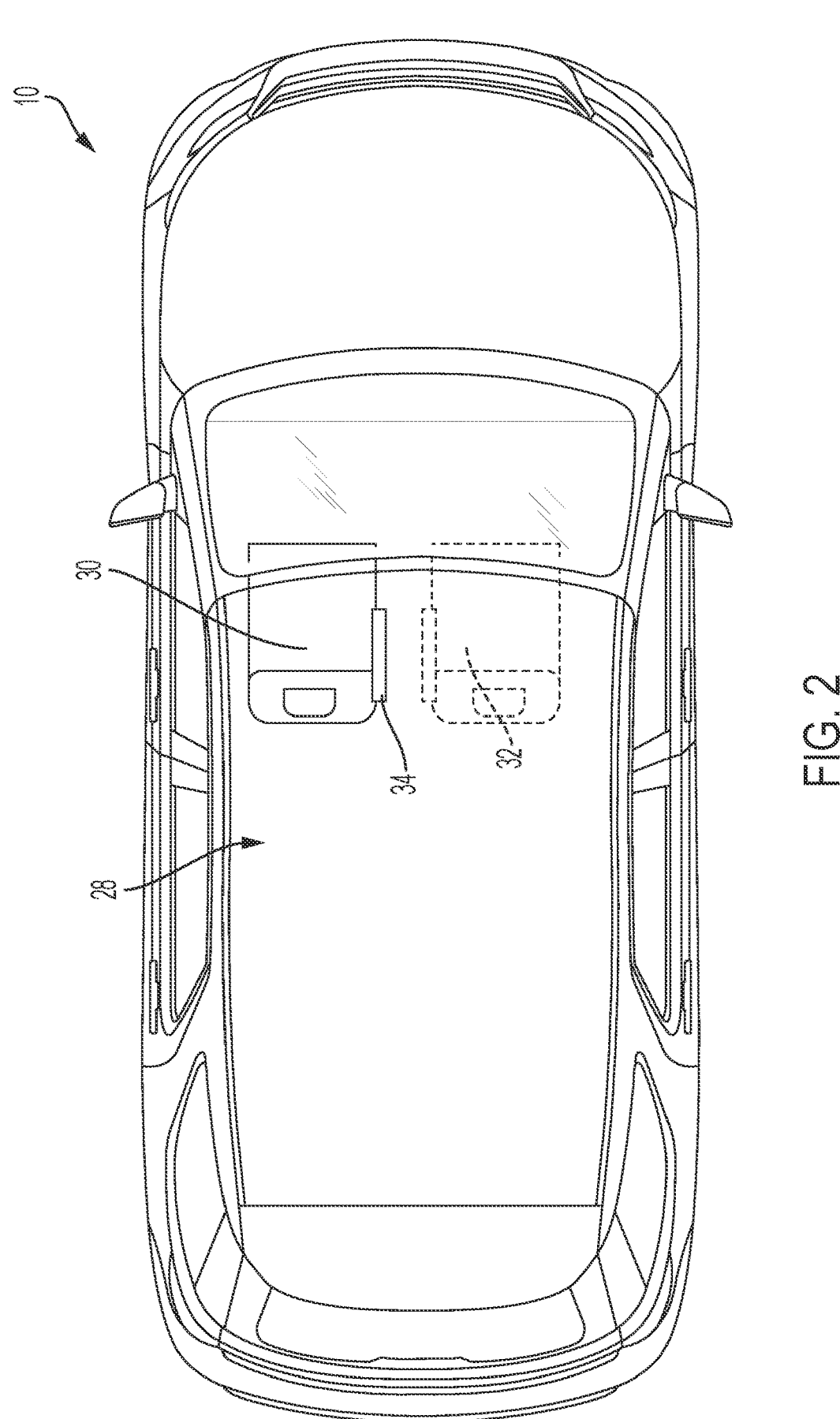
FIG. 2 illustrates a top plan sectioned view of a sport utility vehicle.

Over the past few years, the number of wheelchaired individuals who desire to lead full active lives has increased. To accommodate such individuals, the SUV has become a preferred vehicle of choice, particularly with military veterans who received disabilities during their tours of duty. Consequently, the SUV 10 is further modified or retrofitted as illustrated in FIG. 2 to provide a driver's side seat 30 configured to enable a wheelchaired individual to move from the interior location 28 to the driver's seat 30. In one embodiment, the driver's side seat 30 rotates about a pivotable base. The seat 30 is pivoted clockwise toward the driver, seated in the wheelchair in the middle row, after which the driver moves to the driver's seat 30. Once seated, the seat 30 is rotated back into a forward facing position. The driver side seat 30 is located next to a passenger side seat 32, shown in outline. In one embodiment, the seat 32 is removed to accommodate a wheelchair. As seen in FIG. 2, the driver's side seat 30 includes or may be modified to include an armrest 34.

Figure 3:
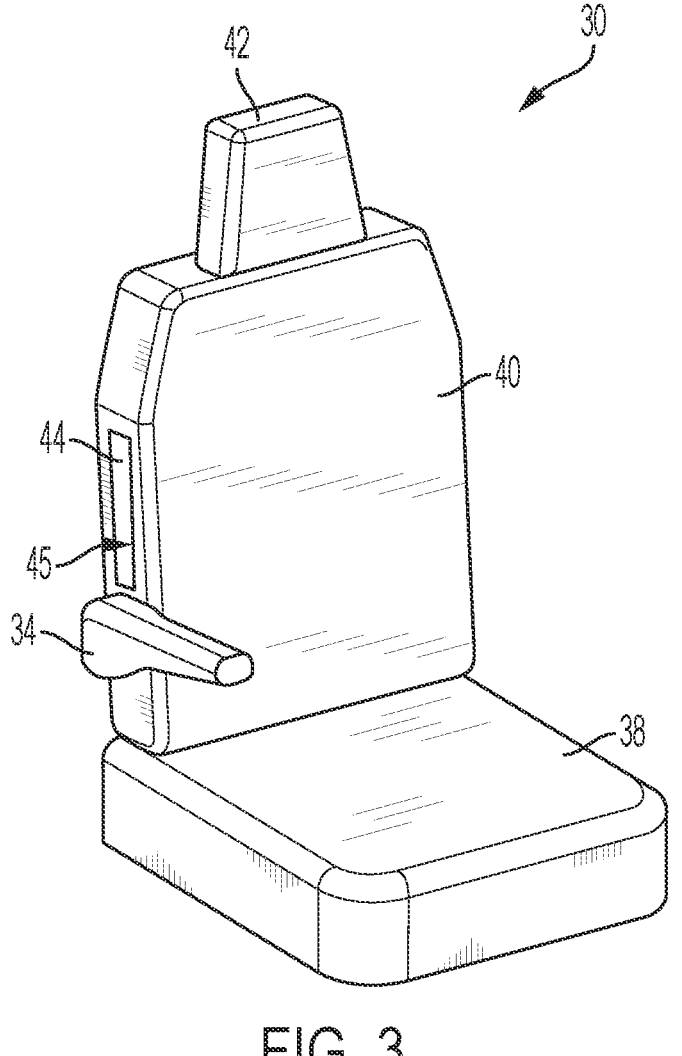
FIG. 3 illustrates a perspective front view of a driver's side seat.

As illustrated in FIG. 3, the seat 30 is one embodiment of a modified OEM seat originally having a seat base 38, a seat back 40, and a headrest 42, extending from the seat back 40. The seat back 40 includes an original seat back airbag (not shown) located within the back 40, that when actuated, is deployed through an airbag aperture 44, located at a side 45 of the seat 30, as is understood by one skilled in the art. Upon activation, the airbag moves through the aperture 44 and into a space adjacent to the driver's side seat 30.

In one or more embodiments, a center console located between the driver and passenger seat of the vehicle is removed to enable the conversion of the driver's side seat. In at least one vehicle, the console is removed which also removes the armrests, supported by the console, for both the driver and front seat passenger. In this situation, the previously available armrest for the OEM driver's side seat is replaced with the armrest 34. The armrest for the passenger side seat is also replaced, essentially in mirror image format to armrest 34. To ensure that the airbag is deployed properly, the OEM armrest 34, and its related assembly, is modified to reduce or eliminate the likelihood of the armrest 34 interfering with deployment of the airbag. In one embodiment, one of the OEM armrests from the second row of seats (that have been removed) is modified and attached to the driver's side seat as armrest 34. In another embodiment, OEM or replacement armrests are purchased and modified as described herein. A new armrest including the features described herein is also contemplated.

To enable the driver to move from the wheelchair to the driver's seat, the armrest should not block the movement of the driver either into or out of the driver's seat. Otherwise, the driver's transition into and out of the driver's seat is quite difficult, if not impossible. Since the armrest 34 is being attached to the seat 30, it is important that the armrest 34 is movable away from its horizontal position to a position that does not block movement of the driver into and out of the seat. While it is possible to move the OEM armrest from one of the second row seats to the driver's seat, the use of the second-row OEM armrest presents additional problems. For instance, while the OEM armrest is configured to rotate in an upward direction, and therefore out of the way of the driver, rotation of the armrest when attached to the seat 30 tends to block expansion of the airbag from the aperture 44. Consequently, the OEM armrest and its support can be modified as described herein to make the OEM armrest removeable and/or to allow the armrest 34 to have a downward facing stowed position.

Figure 4:
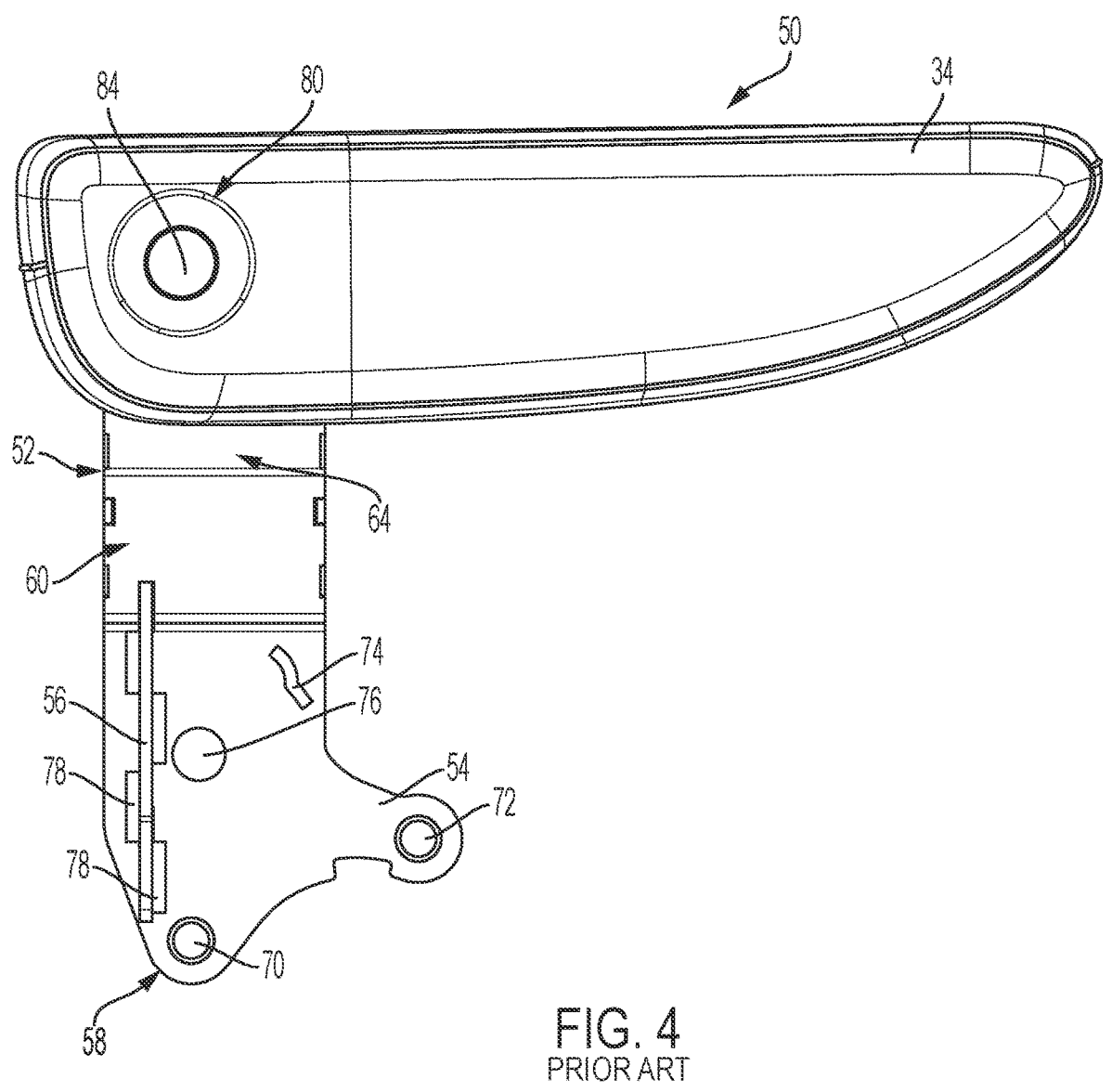
FIG. 4 illustrates a plan view of a prior art armrest assembly.
Figure 5:
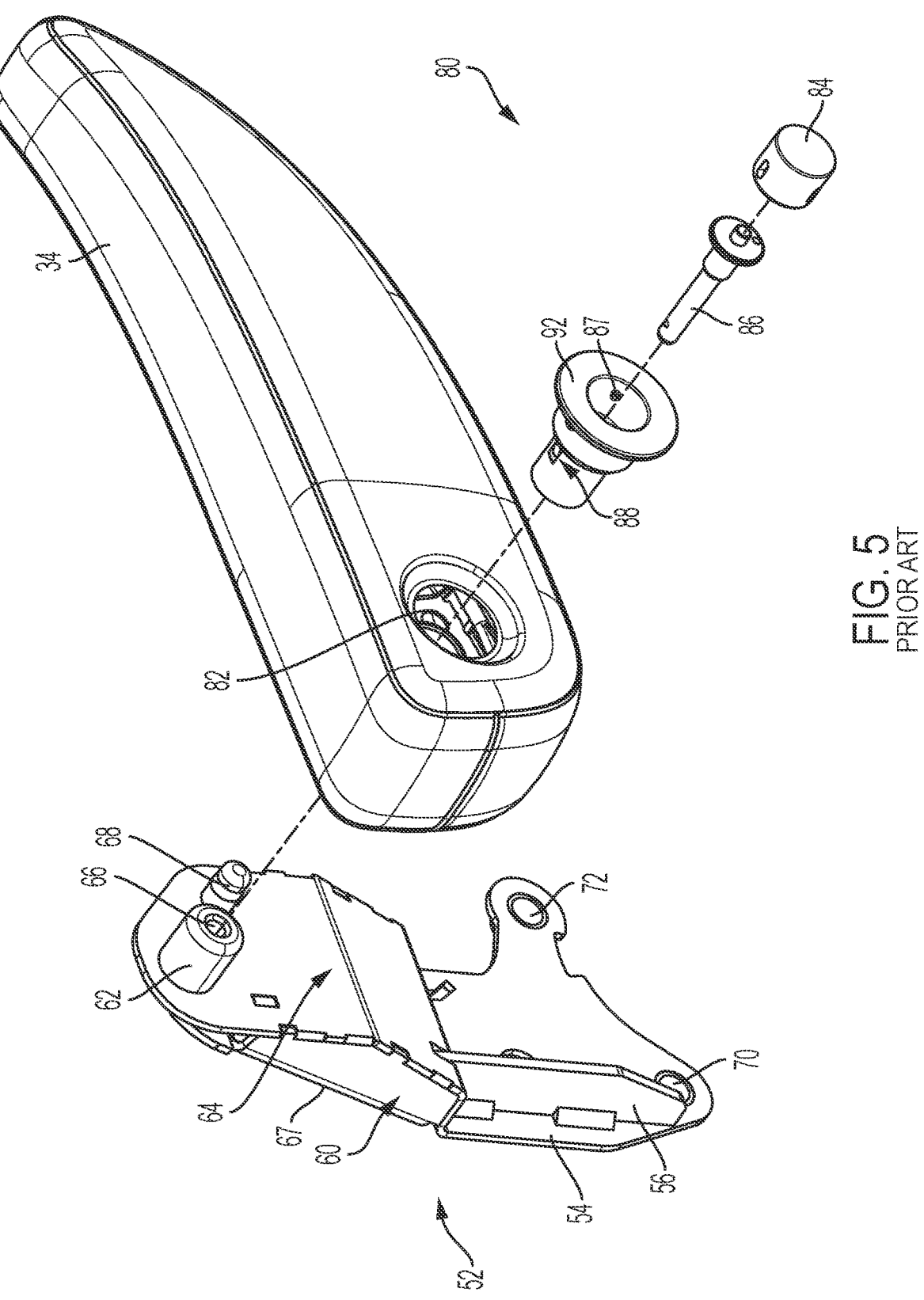
FIG. 5 illustrates an exploded perspective view of the prior art armrest assembly.

FIGS. 4 and 5 illustrate a prior art embodiment of an armrest assembly 50 including the armrest 34 shown in a horizontal position. The armrest assembly 50 is configured to enable the airbag to properly deploy and to thereby maintain the safety features of the seat 30. The armrest 34 is operatively connected to an armrest support 52 through a connector that allows a user to attach the armrest assembly 50 to the armrest support 52 in only one position, i.e. the horizontal position, and to remove the armrest assembly from the seat 30 as needed. The armrest 34 is movable from an attached position to a detached position and vice versa. The driver, or other individual, can detach the armrest 34 to enable the driver to move into the driver's seat, and can reattach the armrest 34 to the driver's seat once the driver is located in the seat 30.

The armrest support 52 is a welded assembly configured to mount the armrest 34. The armrest support 52 includes a blade 54 having a generally flat profile which is supported by a lateral extension 56 extending generally perpendicularly from a surface of the blade 54 and extending along a length of the blade 54. The lateral extension 56 provides a rigid support for the blade 54 and generally extends from a bottom portion 58 to a grommet support 60. The grommet support 60 supports a grommet 62 which is welded to a face 64 of the support 62 as seen in FIG. 5. Other types of connections between the grommet support 60 and the grommet 62 are contemplated. The grommet 62, in one embodiment, is generally cylindrical and includes an aperture 66. In one embodiment, the grommet support 60 and blade 54 define a back side 67 configured to mate with the side 45 of the seat 30. Notably, the back side 67 of the grommet support 60 may not contact the side 120 seat 122 and may instead be spaced therefrom to provide clearance for the airbag to deploy. A detent pin 68 extends from the face 64. When the armrest 34 is coupled to the support 52, the pin 68 extends into an aperture of the armrest (not shown) that prevents rotation of the armrest 34 when mated to the support 52. In another prior art embodiment, the detent pin extends from the armrest 34 and into an aperture of the armrest support. In one prior art embodiment the support 52 is a manufactured part not made as an OEM part. A modified OEM armrest support is also contemplated.

The blade 54 includes an aperture 70 and an aperture 72 each of which is configured to accept a connector (not shown) that extends through the blade 54 to hold the armrest assembly 50 to the seat back 40. The blade 54 further includes clearance features 74 and 76, each of which defines an aperture. Each of the features 74 and 76 respectively receives an extension (not shown) from a seat support (see FIG. 7, element 124) to locate and to maintain the position of the armrest assembly 50 with the seat 30. Welds 78 hold the lateral extension 56 to the blade 54.

The armrest 34 is detachably connected to the armrest support 52 by a quick release connector 80 that extends through an aperture 82 of the armrest 34. The quick release connector 80 is fixedly coupled to the armrest 34 such that the connector 80, and therefore armrest 34, are connected to and released from the grommet 62. The armrest 34 is coupled to the armrest support 52 by placing the aperture 82 over the grommet 62.

The connector 80 includes depressible member or pushbutton 84 that is operatively connected to a release pin 86, both of which extend into an aperture 87 of an adapter bushing 88. The pushbutton 84 is fixedly attached to the release pin 86 by connectors (not shown), such as screws, and the pushbutton 84/release pin 86 combination extends into the aperture 87. The pushbutton 84/release pin 86 combination is fixedly coupled to the adapter bushing 88 by couplers, not shown. The pin 86 includes one or more depressible contacts 90 (depicted best in FIG. 6), such as bearings, that move in response to contact with an inside surface of the grommet 62 at the aperture 66. A spring (not shown) is located in the pin 86 to hold the contacts 90 in position or to release the contacts 90. By depressing or actuating the pushbutton 84, the contacts 90 release the pin 86 from being held by the grommet 62.

The adapter bushing 88 includes a flange 92 that engages the aperture 82. A press fit connects the connector 80 to the armrest 34, such that the armrest 34 and connector 80 are a single assembly that is attachable to and detachable from the grommet 62 and therefore the seat 30. Pressing the pushbutton 84 engages or disengages the pin 86 from the grommet 62 and therefor enables the armrest 34 to be attached to and removed from the seat 30.

Figure 6:
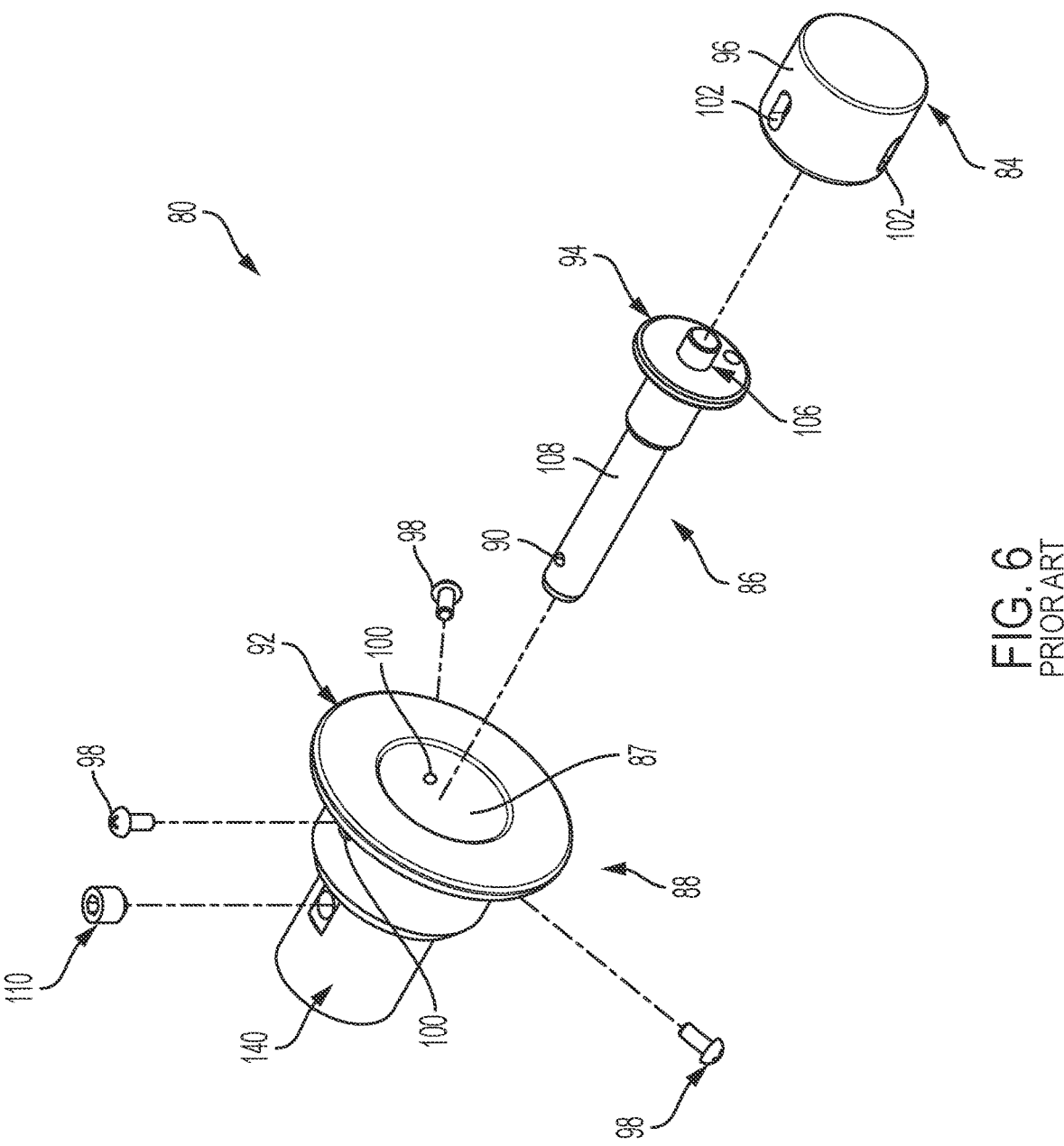
FIG. 6 illustrates an exploded perspective view of the prior art armrest connector.

FIG. 6 illustrates additional details of the connector 80. The pushbutton 84 defines a cavity which includes a dimension sufficient to enable the pushbutton 84 to fit over a release pin flange 94. The pushbutton 84 includes an outer cylindrical portion 96 that slidingly fits within the aperture 87 and which is retained therein by one or more connectors 98. Each connector 98 extends through a hole 100 of the bushing 88 and further extends into a respective slot 102 of the pushbutton 84. Movement of the pushbutton 84 with respect to the adapter bushing 88 is limited by the connector 98 engaging either end of one of the respective slots 102. An interior surface of the pushbutton 84 engages, when placed over the release pin 86, a contact pin 106 that moves within a sleeve 108. Depending on the location of the contact pin 106 with respect to the sleeve 108, the depressible contacts 90 either engage with the grommet 62 or disengage from the grommet 62. The connector 80 is fixedly held within the aperture 82 of the armrest 34 by a connector, not shown. Fixing connector 80 to aperture 82 of armrest 34 can be made with an adhesive to bond the outer diameter 140 of connector 80 to the inner diameter of aperture 82 of armrest 34. A set cup 110 is located in the adapter bushing 88 to secure the release pin 86, and to substantially prevent any movement of the pin 86 inward or outward of the bushing 88. With use of the pushbutton 84, the armrest 34 is removed from and attached to the seat 30 as needed to enable the driver to move into and out of the driver's seat without having to maneuver around a fixed armrest. In addition, by replacing an OEM rotatable armrest with the attachable and detachable armrest as described herein, the safety feature of the seat's side airbag is maintained.

Figure 7:
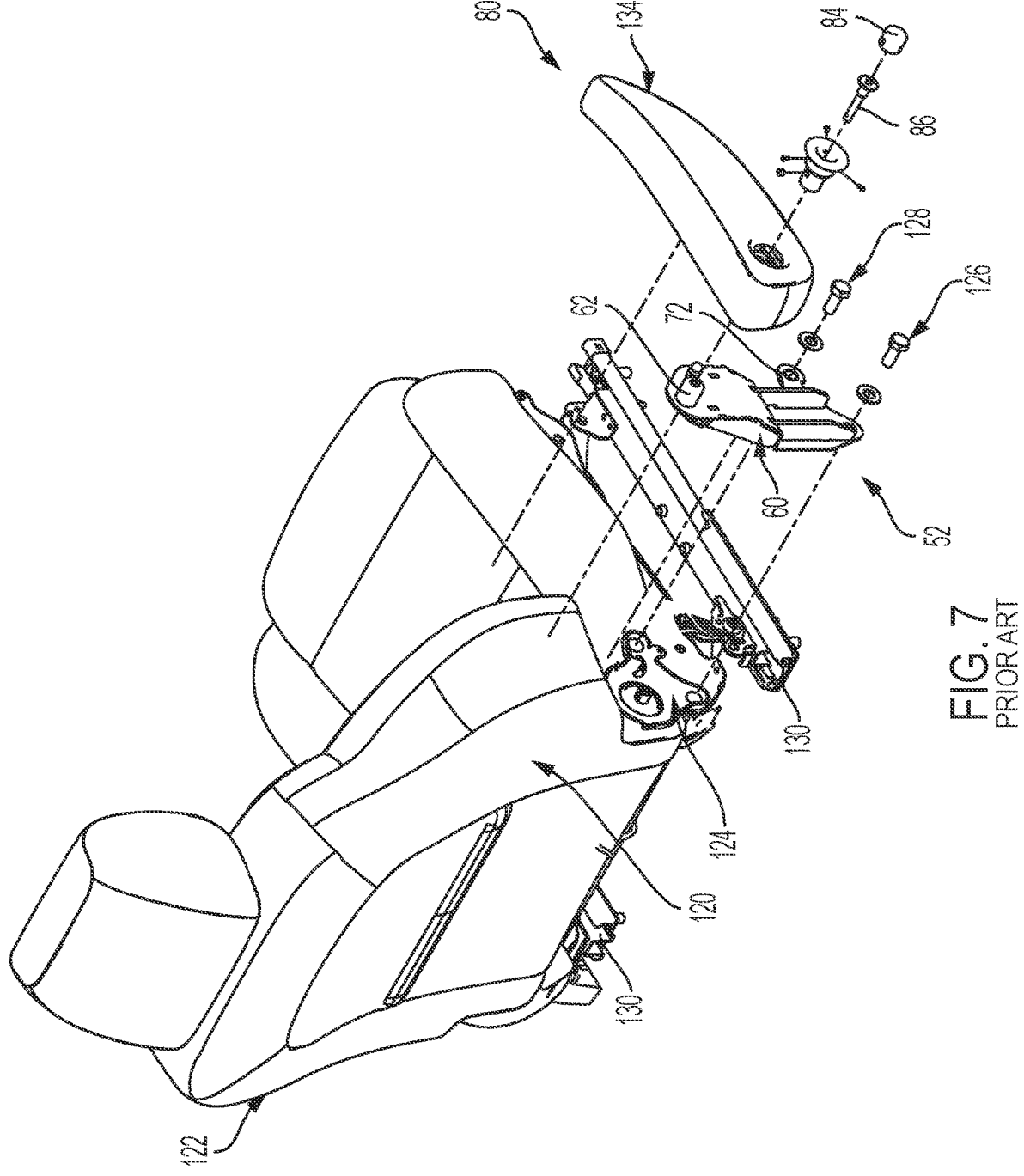
FIG. 7 illustrates the attachment of the prior art armrest support to a side of an OEM seat.

FIG. 7 illustrates the attachment of the armrest support 52 to a side 120 of an OEM seat 122. As can be seen in FIG. 3 and FIG. 7, different types of seats are contemplated, i.e. seat 30 being of a different type than seat 122. The side 120 of seat 122 include an airbag as discussed with the seat 30 of FIG. 3. In FIG. 7, a seat bracket 124 is connected to the seat 122 by a first connector 126 and a second connector 128 each of which extends through apertures 70 and 72 of the armrest support 52. The first and second connectors extend into OEM locations of the seat 122 that are included with the OEM seat 122. As seen in FIG. 5, the back side 67 of support 52 is inclined, with respect to vertical, to contact the side 120 of seat 122, which is also inclined with respect to vertical. The seat 122 is supported by first and second slide mechanisms 130 each of which enables the seat 122 to move toward or away from the steering wheel. The slide mechanisms 130 may be mounted on a base (not shown) that includes a rotating support assembly to enable the seat 122 to rotate toward the middle interior of the vehicle from the driving position facing forward. In the illustrated embodiment of FIG. 7, the seat 122, the seat bracket 124, and the slide mechanisms are OEM parts.

One may appreciate that the prior art embodiment of the armrest assembly 50 has a significant drawback in that it must be removed and reattached each time a wheelchair passenger wishes to transfer into and out of the driver seat 30, 122. Moreover, if the passenger does not wish to use the armrest 34, the prior art armrest assembly 50 must be entirely removed and stored in another location, introducing the possibility of loss or damage to the armrest assembly 50.

With reference to FIGS. 8-11, a first embodiment of the armrest assembly 150 solves the problems of the prior art armrest assembly 50 by allowing the armrest 34 to rotate counterclockwise (CCW) ~270° (for a left-hand driver seat) from a horizontal deployed position D to a vertical, stowed position S, or clockwise (CW) ~90° (again, for a left-hand driver seat) from the deployed position D to the stowed position S. In the stowed position S, the armrest 34 points downward and, in that configuration, will not interfere with expansion of the airbag from the aperture 44 in the side 45 of the seat 30, 122. As described below, the armrest assembly may be permanently fixed to the driver seat 30, 122, eliminating the possibility of loss or damage, or may have a removable connector 80 similar to the prior art armrest assembly 50.

Figures 8, 9:
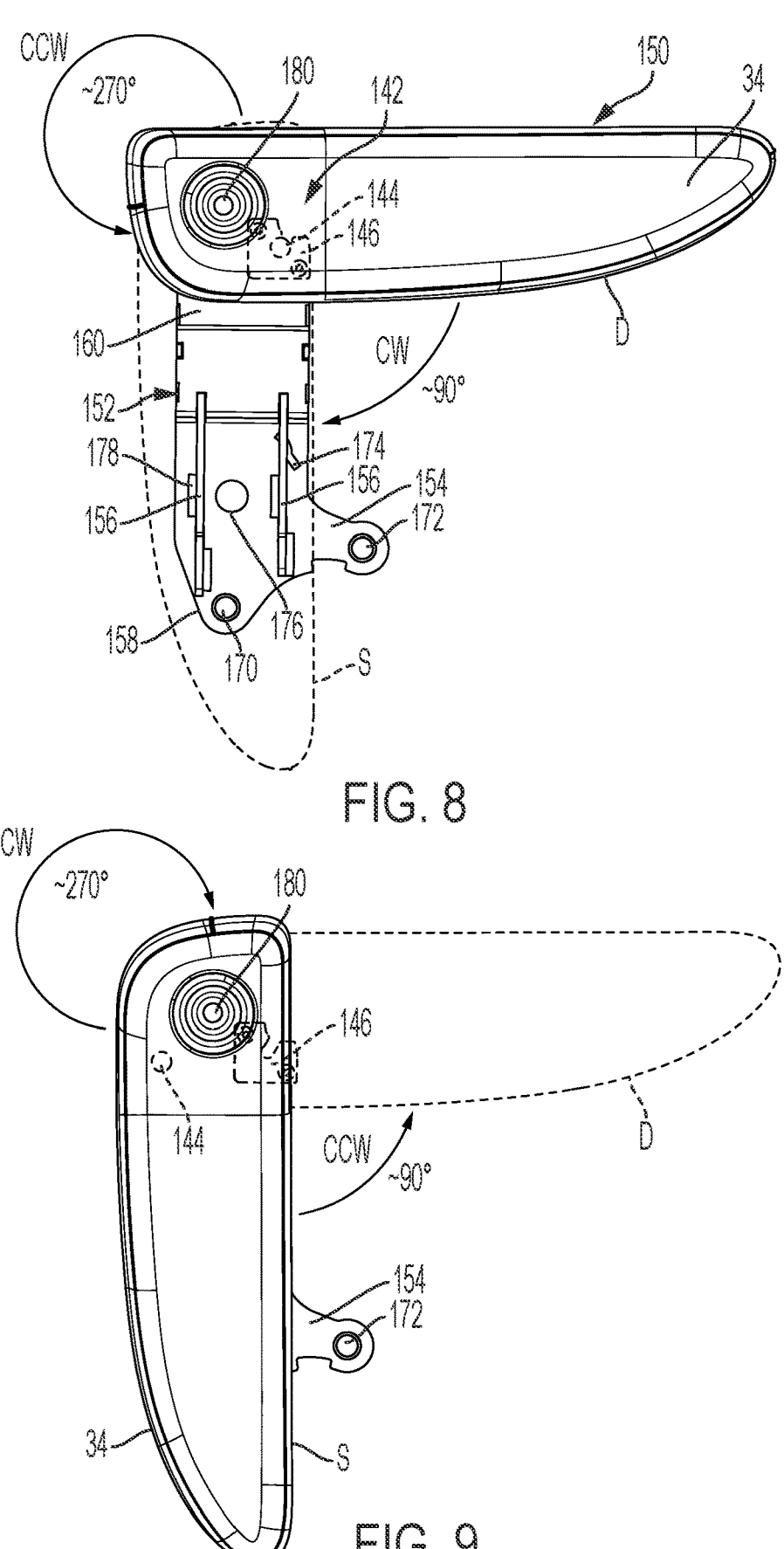
FIG. 8 illustrates a plan view of a first embodiment of an armrest assembly with the armrest in the deployed position.
FIG. 9 illustrates a plan view of the first embodiment with the armrest in the stowed position.

FIG. 8 illustrates the first embodiment of the armrest assembly 150 including the armrest 34 shown in both a horizontal, deployed position D (solid lines) and a vertical, stowed position S (phantom lines). Similarly, FIG. 9 illustrates the armrest assembly 150 including the armrest 34 shown in both a horizontal, deployed position D (phantom lines) and a vertical, stowed position S (solid lines). The armrest assembly 150 is configured to enable the airbag to properly deploy and to thereby maintain the safety features of the seat 30, regardless of whether the armrest 34 is in the deployed position D or the stowed position S. The armrest 34 is operatively connected to an armrest support 152 through a connector 180 that allows the armrest 34 to rotate relative to the seat 30, 120. The armrest 34 is movable from the deployed position D to the stowed position S and vice versa. The armrest assembly 150 includes a locking assembly 142 that allows the armrest to be selectively locked in and unlocked from the deployed position D.

The armrest support 152, like the armrest support 52 of the prior art, is a welded assembly configured to mount the armrest 34. The armrest support 152 includes a blade 154 having a generally flat profile which is supported by one or more lateral extensions 156 extending generally perpendicularly from a surface of the blade 154 and extending along a length of the blade 154. The lateral extensions 156 provide a rigid support for the blade 154 and generally extend from a bottom portion 158 to an upper portion 160. Welds 178 hold the lateral extensions 156 to the blade 154.

In one embodiment, the upper portion 160 defines a back side 167 configured to mate with the side 45 of the seat 30, in the same or similar manner as the back side 67 of the prior art armrest assembly 50. The blade 154 includes an aperture 170 and an aperture 172 each of which is configured to accept a connector (not shown) that extends through the blade 154 to hold the armrest assembly 150 to the seat back 40, again in the same or similar manner as the apertures 70, 72 of the prior art armrest assembly 50. The blade 154 further includes clearance features 174 and 176, each of which defines an aperture. Each of the features 174 and 176 respectively receives an extension (not shown) from a seat support (see FIG. 7, element 124) to locate and to maintain the position of the armrest assembly 150 with the seat 130, again in a similar manner as the prior art armrest assembly 50.

The armrest 34 may be connected to the armrest support 152 by a ball and socket connector assembly 180 disposed primarily in an aperture 182 of the armrest 34. The connector assembly 180 may be fixedly connected at both a first end to the armrest support 152 and at a second end to the armrest 34. Further, the connector assembly 180 may include a ball and socket joint 184 that allows the armrest 34 to pivot relative to the armrest support 152 about any axis.

Figure 10:
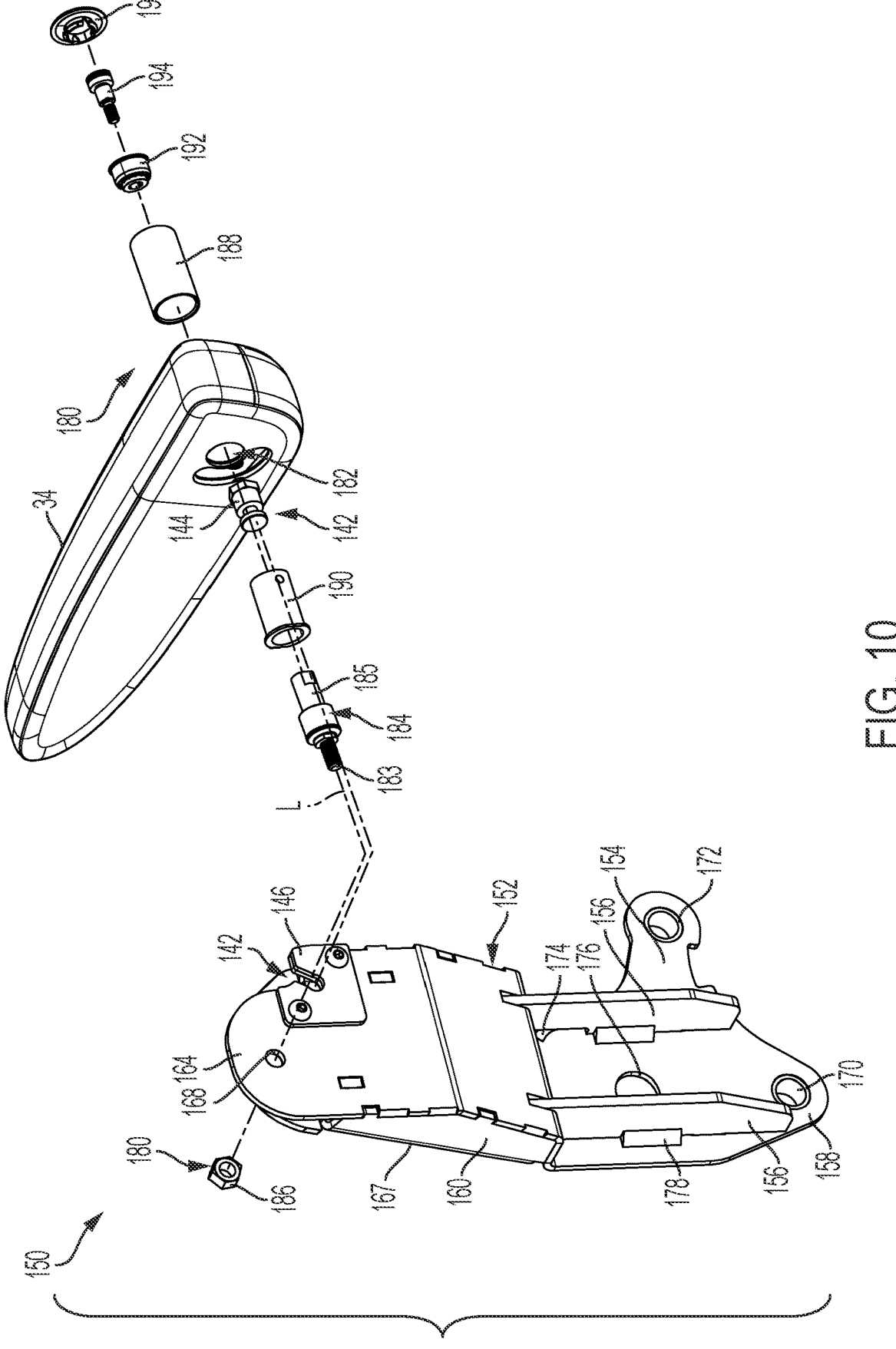
FIG. 10 illustrates an exploded perspective view of the first embodiment.
Figure 11:
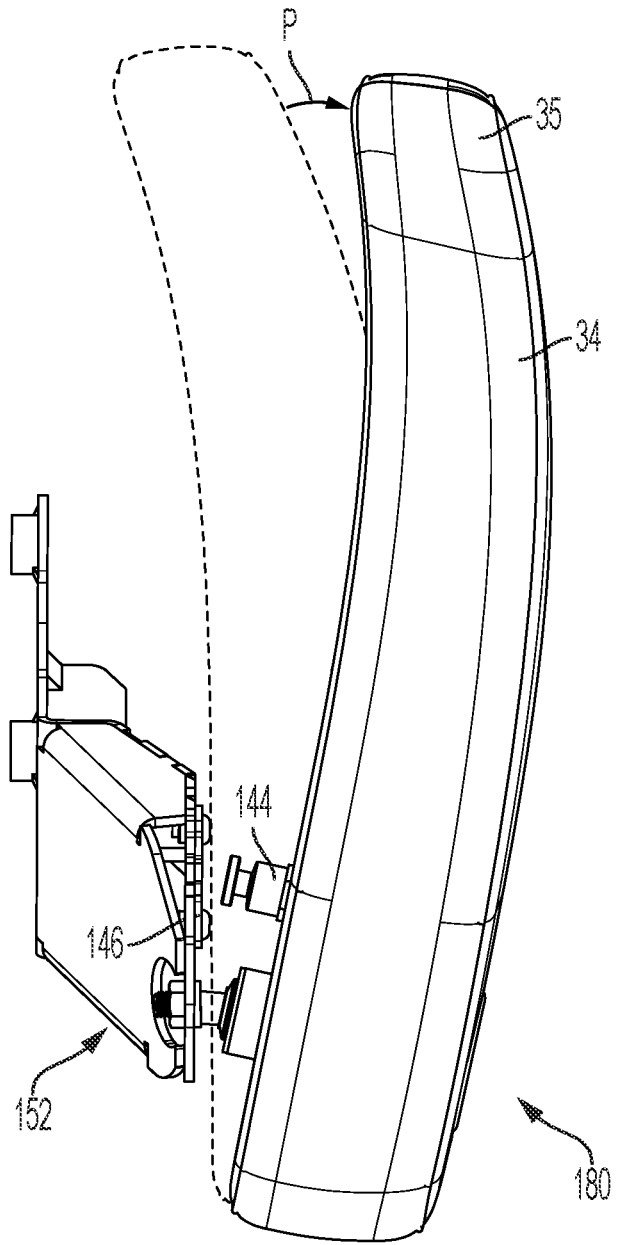
FIG. 11 illustrates a top view of the first embodiment with the armrest in an aligned position (dashed lines) and a misaligned position (solid lines)

With particular reference to FIG. 10, the connector assembly 180 may comprise the ball and socket joint 184, a nut 186, an armrest tube 188, a bushing 190, a flange 192, and bolt 194. The ball and socket joint 184 may have a ball joint end 183 and a socket joint end 185 that can pivot relative to each other. As best shown in FIG. 11, the ball and socket joint 184 serves as a pivot point for the armrest, whereby a free end 35 of the armrest 34 may also pivot outward away from the seat.

The ball joint end 183 may include a threaded portion that is fastened to nut 186 through aperture 168 of the armrest support 152, thereby forming a fixed connection to the armrest support 154. The socket joint end 185 is received in bushing 190, which is received in a first end of the armrest tube 188, which is received within aperture 182 of the armrest 34. More particularly, the bushing 190 is received inside of and configured coaxial with armrest tube 188, whereby armrest tube 188 may rotate relative to bushing 190 about a longitudinal axis L of the bushing. The outside surface of the bushing 190 and inside surface of the armrest tube 188 may comprise low friction materials to allow the armrest 34 to smoothly rotate relative to the armrest support 152. The flange 192 is locked into a second end of the armrest tube 188 via bolt 194. More particularly, the bolt 194 extends through a central aperture of the flange 192 and has a threaded end that lockingly engages with a threaded aperture in the socket joint end 185. End cap 195 may be inserted into the open end of the flange 192 to give the armrest assembly a clean, finished appearance.

The locking assembly 142 may comprise male and female pin connectors 144, 146. In one embodiment, the male pin connector 144 is fixed to the armrest 34, while the female pin connector is fixed to the armrest support. More particularly, the male pin connector 144 may be laterally directed from an inside surface (i.e., the surface facing the seat 30, 122) of the armrest 34. The pin connector 144 may be offset a distance from the longitudinal axis L of the ball and socket joint 184, whereby the pin connector 144 will traverse a circular path CP as the armrest 34 rotates. The female pin connector 146 may be secured to an upper portion 160 of the armrest support 152. In one embodiment, the female pin connector 146 may be attached to a face 164 of the upper portion 160 with fasteners (e.g., screws) as seen in FIG. 10. Other types of connections between the upper portion 160 and the female pin connector 146 are contemplated, including welds. In other embodiments, the female pin connector 146 may be integrated into the upper portion 160. In yet other embodiments, the male pin connector 144 may be fixed to the armrest support 152 while the female pin connector 146 may be fixed to the armrest 34.

As shown, the female pin connector 146 is configured to receive and engage with the male pin connector 144 as the armrest 34 is rotated clockwise CW to the horizontal, deployed position D (i.e., the female pin connector 146 is configured to receive the male pin connector 144 from above). Once engaged, the armrest 34 will be locked in the deployed position D. The locking assembly 142 may be disengaged by rotating the armrest 34 counterclockwise CCW (slightly upward), whereby the male pin connector 144 leaves the female pin connector 146. The user can then continue to rotate the armrest 34 counterclockwise ~270° to the vertical, stowed position S. Alternatively, after disengaging the locking assembly 142, the armrest 34 can then be pivoted outward to a free rotation position FR as shown in FIG. 11 and rotated clockwise (downward) ~90° to the vertical, stowed position S. In the free rotation position FR, the male pin connector 144 is able to clear the female pin connector 146, i.e., pass by the female pin connector 146 without engaging, whereby the armrest 34 can be rotated freely about the longitudinal axis L of the ball and socket joint 184.

As shown and described, the armrest assembly 150 is adapted for connection to a left-hand passenger seat, whereby the ball and socket joint 184 and locking assembly 142 are collectively configured to allow the armrest 34 to rotate either ~90° counterclockwise CCW or ~270° clockwise from its stowed position S to a deployed position D. In alternative embodiments, the armrest assembly 150 may be adapted for connection to a right-hand passenger seat, in which case the ball and socket joint 184 and locking assembly 142 will be collectively configured to allow the armrest 34 to rotate either ~90° clockwise CW or ~270° counterclockwise CCW from its stowed position S to a deployed position D.

One may appreciate that the first improved embodiment of the armrest assembly 150 still has drawbacks, in that the armrest assembly 50 cannot be moved from the stowed position S to the deployed position D using the shortest path (i.e., rotating the armrest counterclockwise CCW 90°) without first pivoting the end 35 of armrest 34 outward from the seat 30, 122, rotating the armrest 34 counterclockwise >90° (slightly past the deployed position D), pivoting the end 35 of the armrest 34 laterally inward to align the locking mechanism 142, and then rotating the armrest 34 clockwise CW to its locked, deployed position D, a complex set of movements which may be difficult or impossible for passengers having limited mobility. A second embodiment of the armrest assembly 250 solves this problem by allowing the armrest to be moved directly from the stow position S to the deployed position D in both directions, without complex movements, by simply rotating the armrest clockwise 270° or counterclockwise 90°.

With reference to FIGS. 12-18, a second embodiment of the armrest assembly 250 solves the problems the prior art armrest assembly 50 and the first improved embodiment of the armrest assembly 150 by allowing the armrest 34 to rotate clockwise (CW) ~270° (for a left-hand driver seat) from a vertical stowed position S to a horizontal deployed position D, or counterclockwise (CCW) ~90° (again, for a left-hand driver seat) from the stowed position S to the deployed position D. More particularly, the second embodiment armrest assembly 250 solves the problems of the first embodiment armrest assembly 150, in that the armrest 34 can be rotated counterclockwise (CCW) ~90° from the stowed position S to the deployed position D simply by rotating the armrest 34, without the need for additional complex movements. As with the first embodiment, in the stowed position S, the armrest 34 points downward and, in that configuration, will not interfere with expansion of the airbag from the aperture 44 in the side 45 of the seat 30, 122. As described below, the armrest assembly 250 may attached to the driver seat 30, 122 using a simple, permanent central bolted pivot, eliminating the possibility of loss or damage. In the alternative, the armrest assembly 250 may have a removable connector 80 similar to the prior art armrest assembly 50, or a ball and socket type joint 180 like the first embodiment armrest assembly 150.

Figures 12, 13:
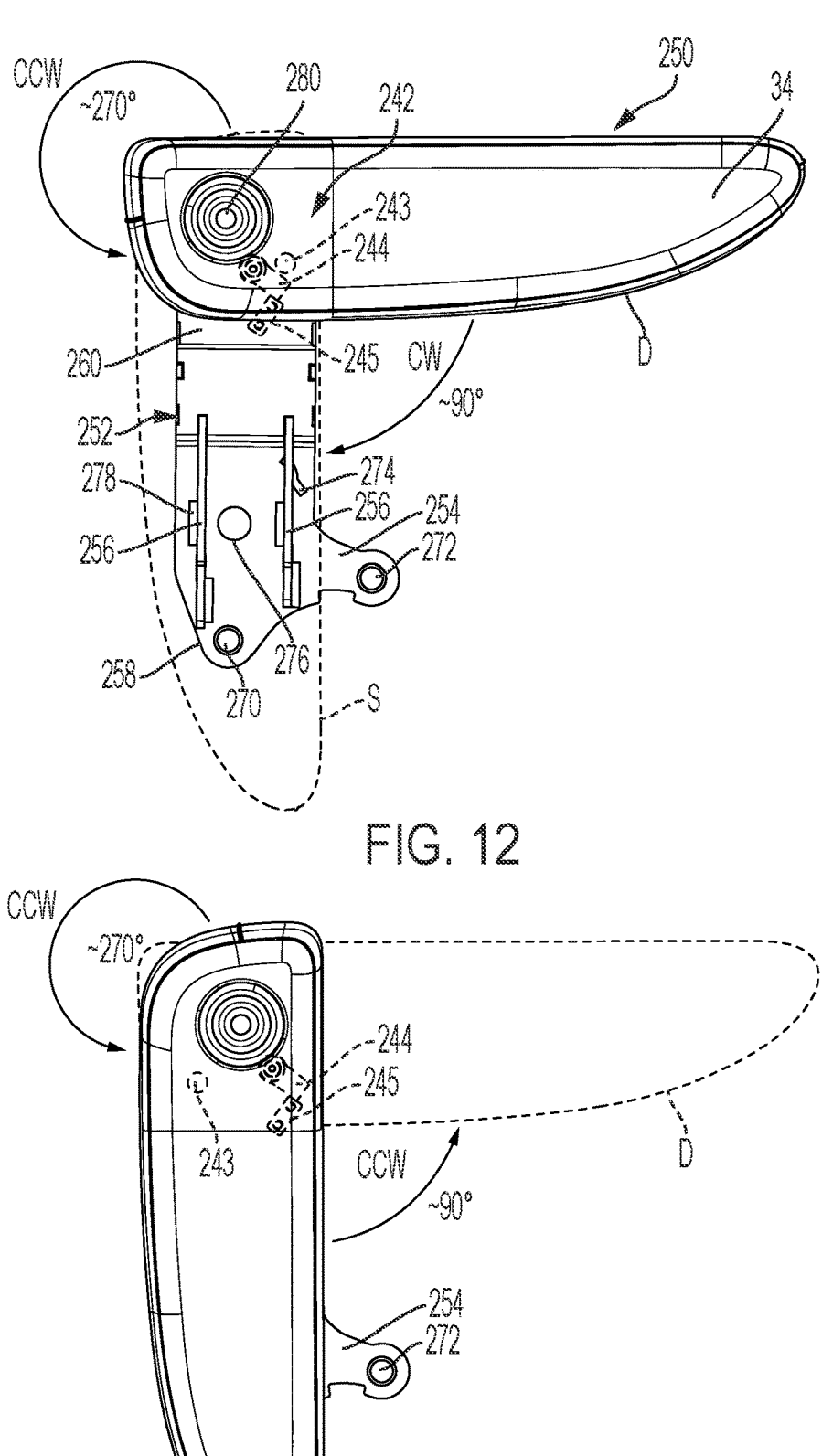
FIG. 12 illustrates a plan view of a second embodiment of an armrest assembly with the armrest in the deployed position.
FIG. 13 illustrates a plan view of the second embodiment with the armrest in the stowed position.
Figure 14:
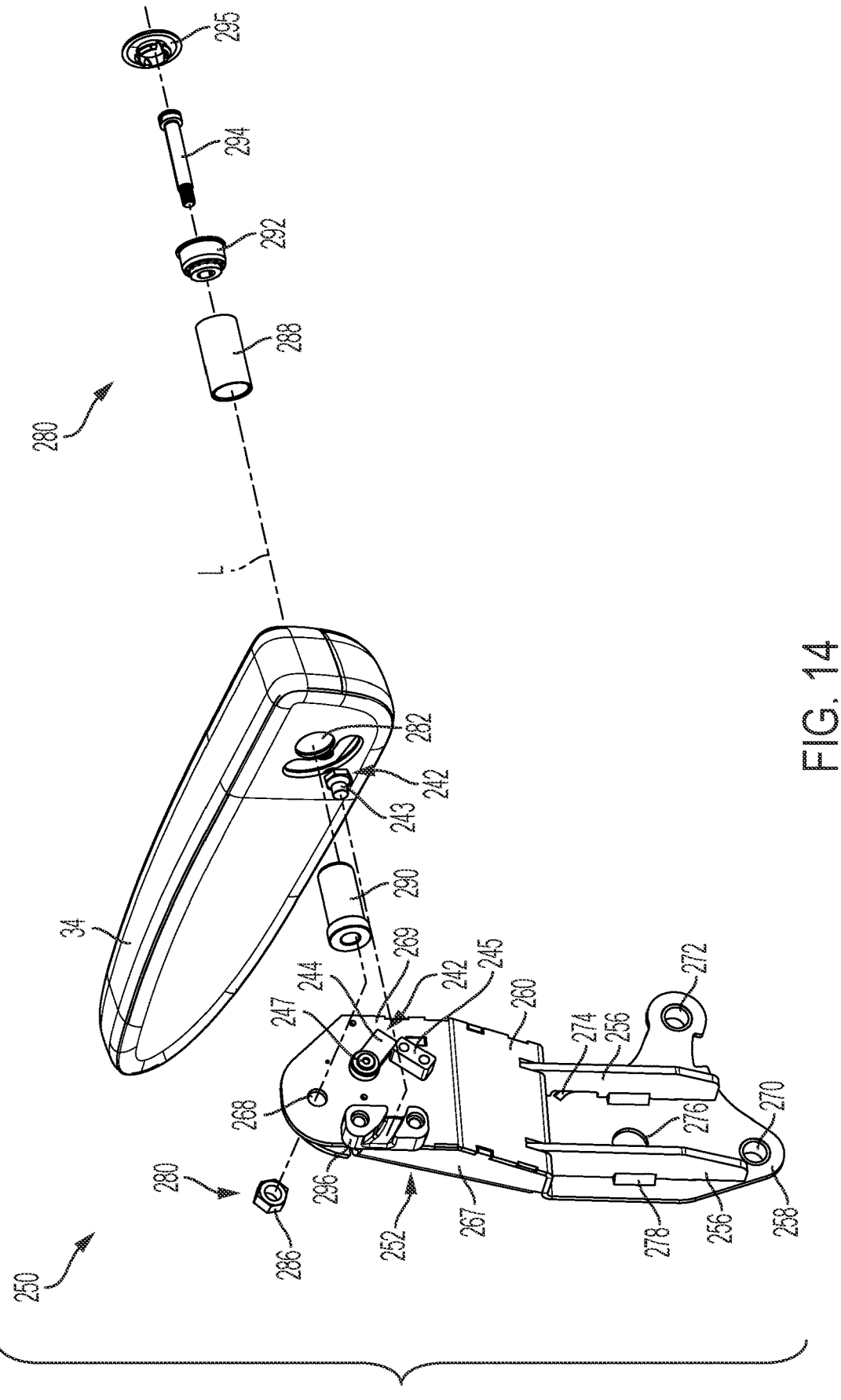
FIG. 14 illustrates an exploded perspective view of the second embodiment.

FIG. 12 illustrates the second embodiment of the armrest assembly 250 including the armrest 34 shown in both a horizontal, deployed position D (solid lines) and a vertical, stowed position S (phantom lines). Similarly, FIG. 13 illustrates the second embodiment of the armrest assembly 250 including the armrest 34 shown in both a vertical, stowed position S (solid lines) and a horizontal, deployed position D (phantom lines). FIG. 14 illustrates the second embodiment of the armrest assembly 250 in a disassembled configuration. The armrest assembly 250 is configured to enable the airbag to properly deploy and to thereby maintain the safety features of the seat 30, regardless of whether the armrest 34 is in the deployed position D or the stowed position S. The armrest 34 is operatively connected to an armrest support 252 through a pivoting connector assembly 280 that allows the armrest 34 to rotate relative to the seat 30, 120. The armrest 34 is movable from the deployed position D to the stowed position S and vice versa. More particularly, the armrest 34 may be rotated ~270° counterclockwise from the deployed position D to the stowed position S, rotated ~270° clockwise from stowed position S to the deployed position D, and rotated ~90° counterclockwise from the stowed position to the deployed position D. As described in further detail below, the armrest assembly 250 includes a locking assembly in the form of a one-way pass-through gate mechanism 242 that prevents the armrest 34 from being rotated clockwise CW from the deployed position D to the stowed position S, but has the added benefit of allowing the armrest 34 to automatically lock in the deployed position D regardless of whether the armrest 34 is moved clockwise CW or counterclockwise CCW from the stowed position. Unlike the first embodiment armrest assembly 150, the armrest 34 of the second embodiment need not move laterally inward and outward to align a locking assembly that holds the armrest 34 in the deployed position D.

The armrest support 252, like the prior art and first embodiment armrest supports 52, 152, is a welded assembly configured to mount the armrest 34. The armrest support 252 includes a blade 254 having a generally flat profile which is supported by one or more lateral extensions 256 extending generally perpendicularly from a surface of the blade 254 and extending along a length of the blade 254. The lateral extensions 256 provide a rigid support for the blade 254 and generally extend from a bottom portion 258 to an upper portion 260. Welds 278 hold the lateral extensions 256 to the blade 254.

In one embodiment, the upper portion 260 defines a back side 267 configured to mate with the side 45 of the seat 30, in the same or similar manner as the prior art and first embodiment back sides 67, 167. The blade 254 includes an aperture 270 and an aperture 272 each of which is configured to accept a connector (not shown) that extends through the blade 254 to hold the armrest assembly 250 to the seat back 40, again in the same or similar manner as the prior art and first embodiment apertures 70, 72, 170, 172. The blade 254 further includes clearance features 274 and 276, each of which defines an aperture. Each of the features 274 and 276 respectively receives an extension (not shown) from a seat support (see FIG. 7, element 124) to locate and to maintain the position of the armrest assembly 250 with the seat 130, again in a similar manner as the prior art and first embodiment armrest assemblies 50, 150.

The armrest 34 may be connected to the armrest support 252 by a pivoting connector assembly 280 disposed primarily in an aperture 282 of the armrest 34. The connector assembly 280 may be fixedly connected at a first end to the armrest support 252 and at a second end to the armrest 34, whereby the armrest 34 can pivot relative to the armrest support about a longitudinal axis of the connector assembly 280.

With particular reference to FIG. 14, the pivoting connector assembly 280 may comprise a nut 286, an armrest tube 288, a bushing 290, a flange 292, and bolt 294. The armrest tube 288 is fixedly connected to the armrest 34 inside aperture 282. The bushing 290 is received inside of and configured coaxial with armrest tube 288, whereby armrest tube 288 may rotate relative to bushing 290, about a longitudinal axis L of the bushing 290. The outside surface of the bushing 290 and inside surface of the armrest tube 288 may comprise low friction materials to allow the armrest 34 to smoothly rotate relative to the armrest support 252. Flange 292 is received in the open end of armrest tube 288 and sits adjacent a first end of bushing 290. The second end of the bushing 290 may be aligned with aperture 268 in the armrest support 252, whereby the bolt 294 may be inserted through centrally located apertures in flange 292 and bushing 290 and connected to nut 286 at the backside 267 of the armrest support 252. End cap 295 may be inserted into the open end of the flange 192 to give the armrest assembly a clean, finished appearance.

With particular reference to FIGS. 14, 15, 16, 17, and 18, the pass-through gate mechanism 242 comprises an armrest pin 243, a one-way gate 244, and a gate stop 245. The armrest pin 243 is attached normal to the inside surface of the armrest 34, parallel to and offset from the rotational axis of the armrest (i.e., offset from the longitudinal axis of bolt 294). In that regard, as the armrest rotates, the armrest pin 243 will traverse circular path 246 in a plane adjacent and parallel to a front side 269 of the upper portion 260. The one-way gate 244 is pivotally fixed at a first end 247 to the front side 269 of the upper portion and may be biased by gravity, and in some embodiments additionally or alternatively by spring force, adjacent stop 245, which is also affixed to the front side 269 of the upper portion 260. In its closed position (see, e g., FIGS. 15 & 18), a second end 248 of the gate 244 rests adjacent the stop 245. As shown, the first end 247 of the gate 244 is disposed internal 249 to the circular path 246 of the armrest pin 243 (toward an origin of the circular path), while the second end 248 and the stop 245 are disposed external 251 to the circular path 246. In alternative embodiments, the first end 247 may be disposed external to the circular path 246 while the second end 248 and stop 245 may be disposed internal to the circular path 246. In any event, in its closed position, the gate 244 extends through (inside) and blocks the circular path 246. In yet additional alternative embodiments, the armrest pin 243 may be affixed to the armrest support 252, while the one-way gate 244 and gate stop 245 may be affixed to the armrest 34.

Figure 18:
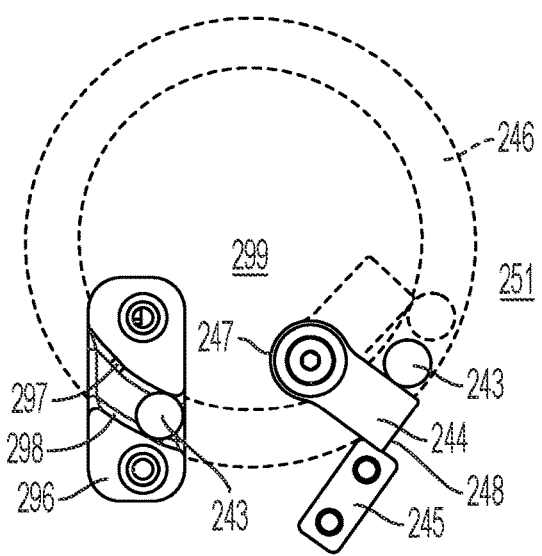

As best shown in FIGS. 15-18, upon application of counterclockwise CCW rotational force to the armrest 34 (e.g., moving the armrest 34 from the stowed position S to the deployed position D), armrest pin 243 will push the gate 244 to from a closed position (FIG. 15), to a partially open position (FIG. 16), and then to an open position (FIG. 17), whereby the gate 244 will open and not block the circular path 246, allowing the armrest to continue rotating counterclockwise CCW. As the armrest pin 243 passes the gate 244, the gate 244 will return to its original, closed position via gravity or spring force as shown in FIG. 18. At this point, the passenger can release the armrest 34, whereby the pin 243 will drop and rest on top of the gate 244, also as shown in FIG. 18. By virtue of engagement between gate 244 and stop 245, the pin 243 will be prevented from passing by the gate 244 in the opposite, clockwise CW direction, and armrest 34 will be held in its deployed position D.

Figure 15:
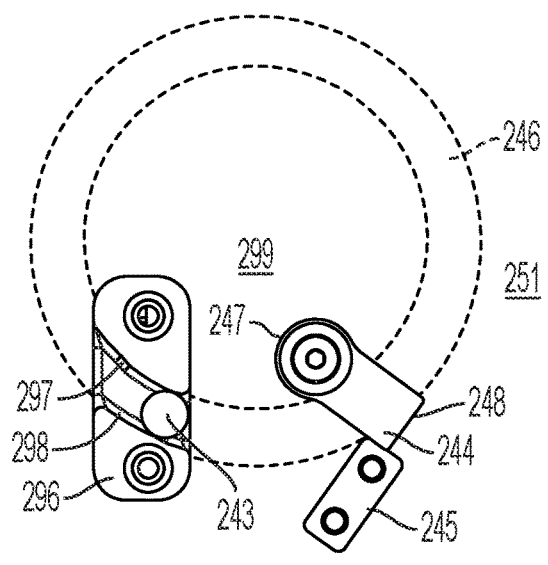
FIG. 15 shows a front view of the one-way gate assembly when the armrest is in the stowed position.
Figure 16:
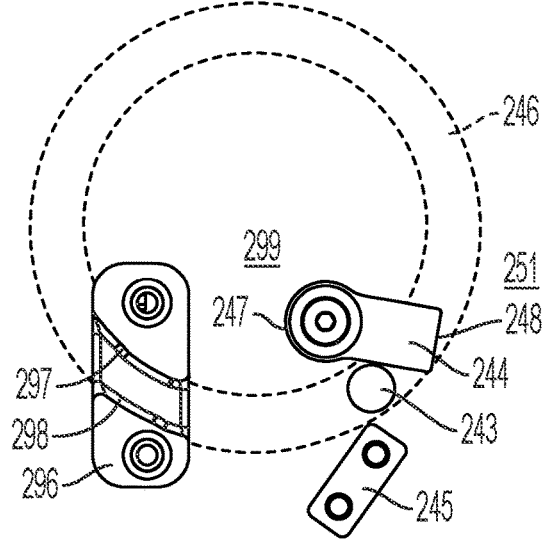
FIG. 16 shows a front view of the one-way gate assembly when the armrest is rotated toward the deployed position in the pass-through direction of the gate assembly.
Figure 17:
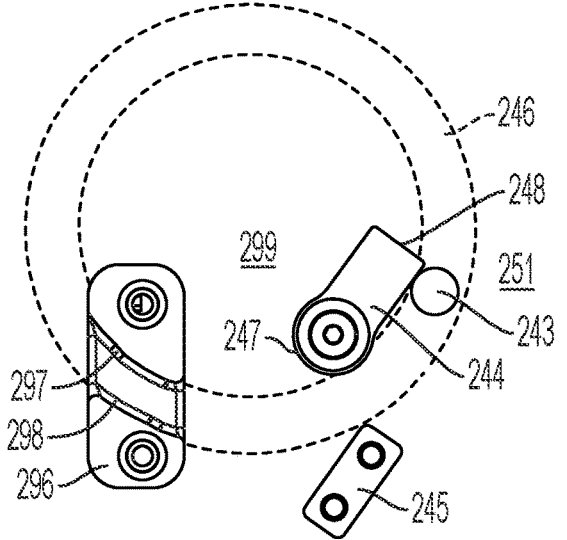
FIG. 17 shows a front view of the one-way gate assembly when the armrest is rotated further toward the deployed position in the pass-through direction of the gate assembly; and, FIG. 18 shows a front view of the one-way gate assembly when the armrest is in the deployed position (solid line) and demonstrates how a gate of the one-way gate assembly blocks passage of the pin as it moves from a first position (dashed line) to the deployed position (solid line) in a blocking direction.

The armrest assembly 250 may include a detent stop 296 that engages with and loosely holds the pin 243, and therefore the armrest 34, in the stowed position S, as best shown in FIG. 15. In one embodiment, the detent stop 296 takes the form of channel 296 formed from one or more structures defining an inner wall 297 and an outer wall 298. The inner and outer walls 297, 298 generally border the inner edge and outer edge, respectfully, of the circular path 246. However, at least one portion of at least one of the inner wall 297 and outer wall 298 protrudes inside the circular path 246, wherein the channel 296 may have at least one reduced width section where the width of the channel drops below the diameter of the pin 243. At least one of the walls 297, 298 will comprise a resilient material (for example, plastic) that will flex upon application of a light or moderate force, whereby the pin 243 can be lightly held in the stowed position S by the reduced width section, but also can be pushed through the reduced width section without the need to apply excessive force.

As shown and described, the armrest assembly 250 is adapted for connection to a left-hand passenger seat, whereby the pass-through gate assembly 242 is configured to allow the armrest 34 to rotate ~90° counterclockwise CCW from its stowed position S to a deployed position D, but to prevent the armrest 34 from rotating clockwise CW from its deployed position D to its stowed position S (in that respect, the pass-through gate assembly 242 holds the armrest 34 in the deployed position D). In alternative embodiments, the armrest assembly 250 may be adapted for connection to a right-hand passenger seat, in which case the pass-through gate assembly 242 will be configured to allow the armrest 34 to rotate ~90° clockwise CW from its stowed position S to a deployed position D, but to prevent the armrest 34 from rotating counterclockwise CCW from its deployed position D to its stowed position S. In both embodiments, the one-way gate assembly 242 permits the armrest to be rotated from the stowed position to the deployed position using both the shortest path and the longest path, but prevents the armrest from being rotated from the deployed position to the stowed position in the downward direction (which for the disclosed embodiments is the shortest path).

While exemplary embodiments incorporating the principles of the present disclosure have been disclosed herein, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An armrest assembly for a seat, the armrest assembly comprising:

an armrest having a pivoting connector adapted for connection to the seat, whereby the armrest can be rotated in both a first rotational direction and a second rotational direction relative to the seat; and, a one-way gate assembly configured to be coupled to at least one of the armrest and the seat, whereby the one-way gate assembly permits the armrest to rotate from a stowed position to a deployed position in both the first rotational direction and the second rotational direction, prevents the armrest from rotating from the deployed position to the stowed position in the first rotational direction, and permits the armrest to rotate from the deployed position to the stowed position in the second rotational direction.

2. The armrest assembly of claim 1, wherein:

the armrest traverses a first path when rotating from the stowed position to the deployed position in the first rotational direction;

the armrest traverses a second path when rotating from the stowed position to the deployed position in the second rotational direction; and, the first path is longer than the second path.

3. The armrest assembly of claim 1, wherein the one-way gate assembly comprises a pin and a gate configured to engage as the armrest rotates relative to the seat, wherein:

one of the pin and the gate are coupled to and rotate with the armrest, wherein the pin traverses a circular path from a frame of reference of the gate;

the gate being moveable between a closed position and an open position;

in the closed position, the gate being disposed inside and blocking the circular path of the pin;

in the open position, the gate being disposed outside of and not blocking the circular path of the pin;

when the armrest is rotated in the second rotational direction, the pin is configured to engage with a first side of the gate and move the gate from the closed position to the open position; and, when the armrest is rotated in the first rotational direction, a second side of the gate is configured to engage with the pin to prevent rotation of the armrest past the deployed position.

4. The armrest assembly of claim 3 further comprising a stop, wherein: the gate is a pivoting lever biased to the closed position against the stop; the pin is configured to push and rotate the pivoting lever to the open position when the armrest is rotated in the second rotational direction whereby the pin may pass thereby; and, the stop is configured to engage with and hold the gate in the closed position, whereby the pin cannot push and rotate the pivoting lever to an open position when the armrest is rotated in the first rotational direction.

5. The armrest assembly of claim 4, wherein the pivoting lever is biased towards the closed position by gravity.

6. The armrest assembly of claim 4, wherein the pivoting lever is biased towards the closed position by a spring.

7. The armrest assembly of claim 3, further comprising a detent configured to be coupled to the same one of the armrest and seat as the gate, wherein the detent is configured to engage with the pin when the armrest is in the stowed position.

8. The armrest assembly of claim 7, wherein the detent comprises a channel having at least one resilient wall that flexes to permit the pin to pass into and out of the stowed position.

9. The armrest assembly of claim 3, wherein the pin is coupled to the armrest at a position offset from a rotational axis of the armrest.

10. The armrest assembly of claim 1, further comprising an armrest support, wherein the armrest is coupled to the armrest support via the pivoting connector and the armrest support is configured for connection to the seat.

11. The armrest assembly of claim 1 coupled to a seat with an airbag that deploys through an aperture in a side of the seat, wherein the armrest does not obstruct deployment of the airbag in both the stowed position and the deployed position.

12. The armrest assembly of claim 11, wherein the armrest is oriented vertically downward from the pivoting connector in the stowed position.

13. The armrest assembly of claim 1, wherein:

the pivoting connector comprises a seat connector configured for attachment to the seat and an armrest connector configured for attachment to the armrest;

one of the armrest connector and the seat connector is rotatable relative to the other about a rotational axis in the first direction and the second direction between the stowed orientation and the deployed orientation;

the one-way gate assembly comprises a pin and a gate;

the pin is coupled to one of the armrest connector and the seat connector; and the gate coupled to the other of the armrest connector and the seat connector, the gate being configured to:

move to an open position to allow the pin to pass as the armrest rotates from the stowed orientation to the deployed orientation; and block the pin to prevent rotation from the deployed orientation toward the stowed orientation along a shortest rotational path.

14. The armrest assembly of claim 13, wherein the gate comprises a pivoting lever biased to the closed position against a stop;

the pin is configured to push and rotate the pivoting lever to the open position when the armrest is rotated in the second rotational direction whereby the pin may pass thereby; and, the stop is configured to engage with and hold the gate in the closed position, whereby the pin cannot push and rotate the pivoting lever to an open position when the armrest is rotated in the first rotational direction.

15. The armrest assembly of claim 14, wherein the pivoting lever is biased against the stop by gravity.

16. The armrest assembly of claim 13, further comprising a detent configured to be coupled to the same one of the armrest and seat as the gate, wherein the detent is configured to engage with the pin when the armrest is in the stowed position.

17. The armrest assembly of claim 16, wherein the detent comprises a channel having at least one resilient wall that flexes to permit the pin to pass into and out of the stowed position.

18. The armrest assembly of claim 16, wherein the detent is positioned such that the armrest is in a substantially downwards vertical direction in the stowed position.

19. The armrest assembly of claim 13, wherein the seat comprises an airbag, and wherein the armrest does not block the airbag in either of the stowed or deployed positions.

20. A method of modifying an OEM vehicle using the armrest assembly of claim 1, the method comprising the steps of:

removing a center console between a driver seat and a passenger seat;

providing the armrest assembly; and, attaching the armrest assembly to at least one of the driver seat and the passenger seat, wherein the at least one of the driver seat and the passenger seat includes an airbag that deploys through an aperture in a side of the seat, and wherein the armrest does not obstruct deployment of the airbag in both the stowed position and the deployed position.

* * * * *